United States Patent
Mitsunaga et al.

(10) Patent No.: US 10,409,968 B2
(45) Date of Patent: Sep. 10, 2019

(54) INFORMATION PROCESSING SYSTEM, INFORMATION PROCESSING DEVICE, AND INFORMATION PROCESSING TERMINAL

(71) Applicant: SONY CORPORATION, Tokyo (JP)

(72) Inventors: Tomoo Mitsunaga, Kanagawa (JP); Kensei Jo, Kumamoto (JP); Takayuki Yoshigahara, Tokyo (JP); Masaki Fukuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 125 days.

(21) Appl. No.: 15/513,756

(22) PCT Filed: Aug. 7, 2015

(86) PCT No.: PCT/JP2015/072573
§ 371 (c)(1),
(2) Date: Mar. 23, 2017

(87) PCT Pub. No.: WO2016/059860
PCT Pub. Date: Apr. 21, 2016

(65) Prior Publication Data
US 2017/0293746 A1 Oct. 12, 2017

(30) Foreign Application Priority Data
Oct. 15, 2014 (JP) ................. 2014-210857

(51) Int. Cl.
*G06F 21/31* (2013.01)
*G06F 21/34* (2013.01)
(Continued)

(52) U.S. Cl.
CPC .............. *G06F 21/31* (2013.01); *G06F 21/34* (2013.01); *G06Q 40/02* (2013.01); *G07D 9/00* (2013.01);
(Continued)

(58) Field of Classification Search
CPC ...... H04L 63/08; H04L 63/0428; G06F 21/31
See application file for complete search history.

(56) References Cited

U.S. PATENT DOCUMENTS 8,632,000 B2 * 1/2014 Laracey ............. G06Q 20/1085
235/379
2014/0286644 A1 * 9/2014 Oshima .................. H04B 10/11
398/118

FOREIGN PATENT DOCUMENTS

JP 2007-172004 A 7/2007
JP 2007-193762 A 8/2007
(Continued)

*Primary Examiner* — Ali S Abyaneh
(74) *Attorney, Agent, or Firm* — Chip Law Group

(57) ABSTRACT

An information processing system including: an information processing device including a light source, and a visible light communication control unit configured to control a light emission state of the light source on the basis of identification information of the information processing device and transmit the identification information; and an information processing terminal including an imaging unit, an identification information acquiring unit configured to perform image processing on an image of the light source captured by the imaging unit and acquire the identification information of the information processing device, a display control unit configured to control display of an input screen for input of an operation to the information processing device on the basis of the identification information, and an input information transmitting unit configured to transmit input information input to the input screen to the information processing device.

10 Claims, 13 Drawing Sheets

(51) Int. Cl.
  *G06Q 40/02* (2012.01)
  *G07D 9/00* (2006.01)
  *H04N 1/00* (2006.01)
  *G06F 21/32* (2013.01)
  *H04N 1/32* (2006.01)

(52) U.S. Cl.
  CPC ......... *H04N 1/00204* (2013.01); *G06F 21/32* (2013.01); *H04N 1/00127* (2013.01); *H04N 1/32101* (2013.01)

(56) References Cited

FOREIGN PATENT DOCUMENTS

| | | | |
|---|---|---|---|
| JP | 2008-134733 | A | 6/2008 |
| JP | 2008-269186 | A | 11/2008 |
| JP | 2007-241359 | A | 9/2009 |
| JP | 2009-245272 | A | 10/2009 |
| JP | 2010128629 | A * | 6/2010 |
| WO | 2013/175803 | A1 | 11/2013 |

\* cited by examiner

INFORMATION PROCESSING SYSTEM, INFORMATION PROCESSING DEVICE, AND INFORMATION PROCESSING TERMINAL

CROSS REFRENCE TO RELATED APPLICATIONS

This application is a U.S. National Phase of International Patent Application No. PCT/JP2015/072573 filed on Aug. 7, 2015, which claims priority benefit of Japanese Patent Application No. JP 2014-210857 filed in the Japan Patent Office on Oct. 15, 2014. Each of the above-referenced applications is hereby incorporated herein by reference in its entirety.

TECHNICAL FIELD

The present disclosure relates to an information processing system, an information processing device, and an information processing terminal.

BACKGROUND ART

In recent years, a large number of information processing devices having a user authentication function are installed in convenience stores, stations, public spaces, or the like. The information processing devices can provide dedicated services to authenticated users. Specifically, an automatic teller machine (ATM), a ticketing machine of a concert ticket or the like, and an automatic issuing machine of a certificate or the like correspond to the above-mentioned information processing devices.

The information processing device as described above is installed at a place allowing a large number of unspecified users to operate it. Therefore, for example, a camera for the purpose of secret photographing or the like is set to an input unit, and user authentication information input to the information processing device by the user might be snatched (so-called "skimmed").

Therefore, the following Patent Literatures 1 to 5 propose information processing devices that can input or display information via a mobile communication terminal or the like possessed by a user.

Specifically, Patent Literature 1 discloses an information processing system that, in a case where the information processing device displays a two-dimensional code image and the mobile communication terminal captures the image, transmits user authentication information corresponding to the captured two-dimensional code image to a server for user authentication.

Further, Patent Literature 2 discloses an automatic teller machine that stores executed transaction result information to another server and displays on a display unit a two-dimensional code image including information indicating a storage destination of the transaction result information.

Further, Patent Literatures 3 to 5 disclose a technology for transmitting information necessary for transaction to the automatic teller machine by allowing the mobile communication terminal to display a two-dimensional code image acquired by converting user information necessary for authentication or transaction content information and allowing an automatic teller machine (ATM) to read the image.

CITATION LIST

Patent Literature

Patent Literature 1: JP 2007-193762A
Patent Literature 2: JP 2007-172004A
Patent Literature 3: JP 2007-241359A
Patent Literature 4: JP 2008-134733A
Patent Literature 5: JP 2009-245272A

DISCLOSURE OF INVENTION

Technical Problem

However, with the technologies disclosed in Patent Literatures 1 to 5, the two-dimensional code image is used for information transmission between the information processing device and the mobile communication terminal. Therefore, in the case of secret photographing of the displayed two-dimensional code image, the information included in the two-dimensional code image might be snatched. Consequently, an information processing system has been required which uses communication means that makes it difficult to snatch the information with information transmission between the information processing device and the mobile communication terminal.

Then, the present disclosure proposes an information processing system, an information processing device, and an information processing terminal that are novel and improved with improvement of security properties.

Solution to Problem

According to the present disclosure, there is provided an information processing system including: an information processing device including a light source, and a visible light communication control unit configured to control a light emission state of the light source on the basis of identification information of the information processing device and transmit the identification information; and an information processing terminal including an imaging unit, an identification information acquiring unit configured to perform image processing on an image of the light source captured by the imaging unit and acquire the identification information of the information processing device, a display control unit configured to control display of an input screen for input of an operation to the information processing device on the basis of the identification information, and an input information transmitting unit configured to transmit input information input to the input screen to the information processing device.

Further, according to the present disclosure, there is provided an information processing device including: a light source; and a visible light communication control unit configured to control a light emission state of the light source on the basis of identification information of the information processing device and transmit the identification information.

Still further, according to the present disclosure, there is provided an information processing terminal including: an imaging unit; an identification information acquiring unit configured to perform image processing on an image captured by the imaging unit and acquire identification information of an information processing device transmitted by a light emission state of a light source of the information processing device; a display control unit configured to control display of an input screen for input of an operation to the information processing device on the basis of the identification information; and an input information transmitting unit configured to transmit input information input to the input screen to the information processing device.

According to the present disclosure, the information processing terminal receives identification information of the information processing device with visible light communication that makes it difficult to snatch the information by secret photographing or the like, and displays an input screen corresponding to the information processing device. Further, the information processing terminal transmits an input operation input to the input screen to the information processing device, and the information processing device executes processing on the basis of the transmitted input operation. As a consequence, a user can perform an input operation to the information processing device by using the information processing terminal.

Advantageous Effects of Invention

As described above, according to the present disclosure, the security properties can be improved in the information processing system.

Note that the effects described above are not necessarily limitative. With or in the place of the above effects, there may be achieved any one of the effects described in this specification or other effects that may be grasped from this specification.

MODE FOR CARRYING OUT THE INVENTION

Figure 1:
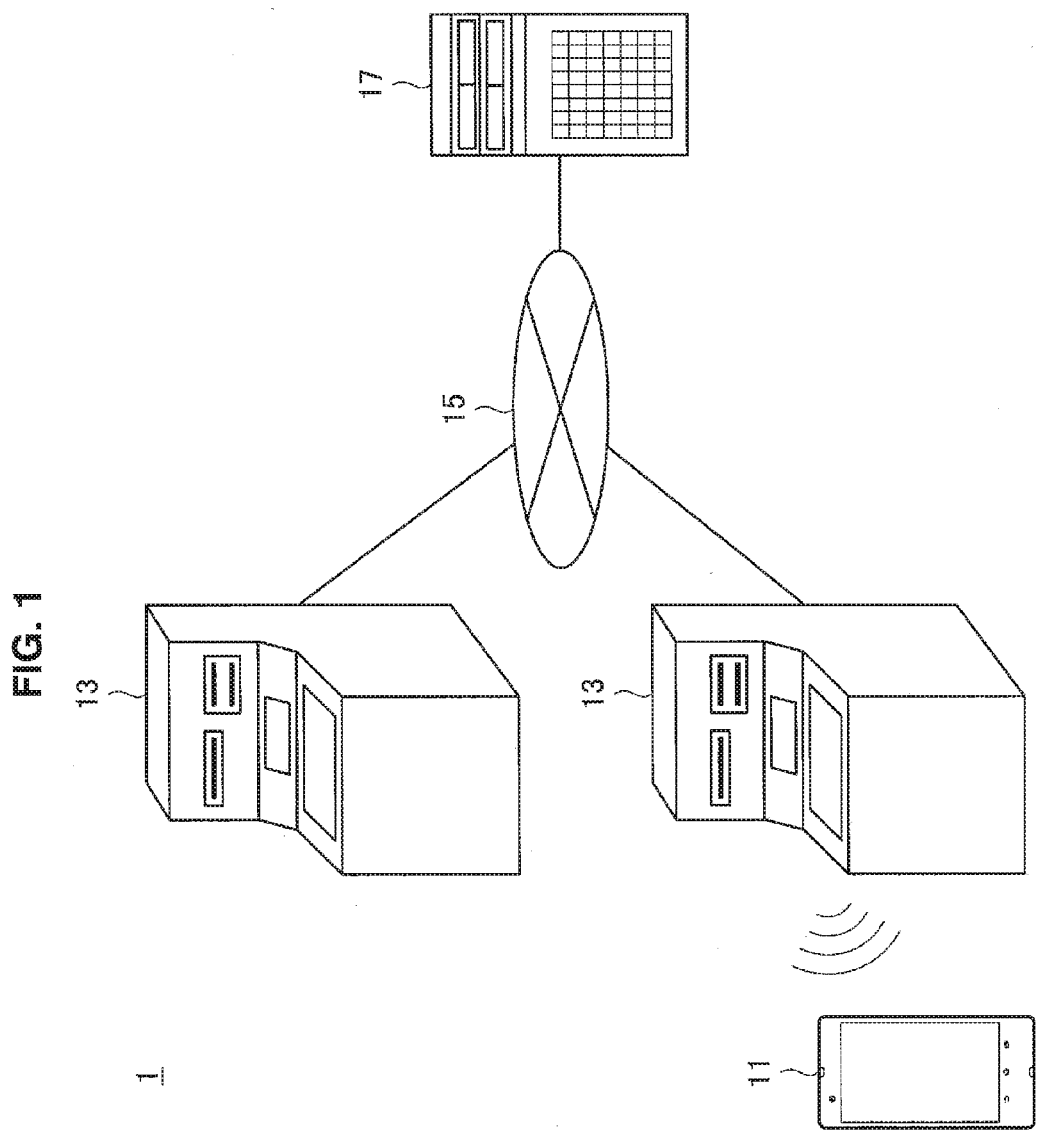
FIG. 1 is an explanatory diagram illustrating an entire configuration of an information processing system according to an embodiment of the present disclosure.

Hereinafter, a preferred embodiment of the present disclosure will be described in detail with reference to the appended drawings. In this specification and the appended drawings, structural elements that have substantially the same function and structure are denoted with the same reference numerals, and repeated explanation of these structural elements is omitted.

Note that a description will be given in the following order.
1. Information processing system according to an embodiment of the present disclosure
  1.1. Configuration of information processing system
  1.2. Configurations of information processing terminal and information processing device
  1.3. Operation of information processing system
2. Acquiring method of identification information
  2.1. First acquiring method
  2.2. Second acquiring method
  2.3. Third acquiring method
3. Hardware configuration according to an embodiment of the present disclosure
4. Conclusion <1. Information Processing System According to an Embodiment of the Present Disclosure>

First, a description will be given of an information processing system according to an embodiment of the present disclosure with reference to FIGS. 1 to 5. With the information processing system according to the present embodiment, an information processing terminal that is possessed by a user receives identification information transmitted by visible light communication, and the information processing terminal consequently performs an input operation to an information processing device.

Herein, the information processing terminal may be, e.g., a mobile communication terminal such as a mobile phone and a smartphone or a personal digital assistant (PDA). Further, the information processing device may be a device providing services that require user authentication, such as an automatic teller machine (ATM), a ticketing machine of a concert ticket or the like, or an automatic issuing machine of a certificate or the like.

Note that, in the following, a description will be given by exemplifying the automatic teller machine (ATM) as the information processing device and exemplifying an automatic transaction system that executes a finance transaction to a user as the information processing system. However, the technology according to the present disclosure can be obviously applied to an information processing system that provides services requiring the user authentication other than the automatic transaction system.

[1.1. Configuration of Information Processing System]

First, a description will be given of a schematic configuration of the entire information processing system according to an embodiment of the present disclosure with reference to FIG. 1. FIG. 1 is an explanatory diagram illustrating the entire configuration of the information processing system according to the present embodiment.

As illustrated in FIG. 1, an information processing system 1 according to the present embodiment includes: an information processing terminal 11; an information processing device 13; a network 15; and a financial institution server 17. Further, a plurality of the information processing devices 13 may be provided.

The information processing terminal 11 is, e.g., a mobile phone, a smartphone, or the like possessed by a user, and includes an imaging unit such as a camera. With the information processing terminal 11, the imaging unit can capture an image of identification information of the information processing device 13 transmitted as change of a light emission state of a light source, and perform image processing on the captured image, thereby acquiring the identification information.

Further, the information processing terminal 11 displays an input screen for enabling input of an operation to the information processing device 13 on the basis of the acquired identification information and transmits the operation input to the input screen to the information processing device 13. As a consequence, the user can perform the input operation to the information processing device 13 with the information processing terminal 11.

The information processing device 13 is an automatic teller machine installed at, e.g., a bank, a convenience store, or the like, and includes a light source. The information processing device 13 can encode self-identification information, and transmit the encoded identification information to the information processing terminal 11 by the change of the light emission state of the light source. For example, the light source may be a display device that displays an image and the like, and the information processing device 13 may transmit the identification information to the information processing terminal 11 by changing a luminance or a hue of an image displayed on the display device.

Here, the change of the light emission state of the light source with the information processing device 13 is performed at a frequency high enough for a human visual sense not to recognize the change. The frequency that cannot be recognized by the human visual sense is, e.g., 70 Hz or more, and the information processing device 13 controls the light emission state of the light source at, e.g., approximately 10 kHz. As a consequence, the information processing device 13 can transmit the information to the information processing terminal 11 with communication means that is not visually recognized by the user.

Further, the information processing device 13 executes various transactions on the basis of an input operation of the user transmitted from the information processing terminal 11. For example, the information processing device 13 may execute various transactions that can be generally executed as the automatic teller machine, such as deposit withdrawal, deposit of cash, and balance check.

The network 15 is a dedicated network that a financial institution has, e.g., Internet protocol-virtual private network (IP-VPN). Further, the network 15 as a dedicated network that is not generally opened may be a wired or wireless local area network (LAN).

The financial institution server 17 is, e.g., a host server of a financial institution, and controls various transactions in the respective information processing devices 13. For example, the financial institution server 17 authenticates the user that operates the information processing device 13, and executes transaction processing such as account activity and transfer instructed by an operation of the user. Further, the financial institution server 17 manages, as a ledger of a bank account, client information such as an account number, password, name, address, age, birthday, phone number, occupation, family member, annual income, and deposit balance.

In the information processing system 1 according to the present embodiment, the information processing device 13 transmits identification information by changing the light emission state of the light source. Further, the information processing terminal 11 captures an image of the light source by a camera or the like, and acquires the change of the light emission state of the light source, thereby acquiring the identification information of the information processing device 13 and displaying the input screen corresponding to the acquired identification information. Herein, the information processing terminal 11 establishes communication connection with the information processing device 13 that acquires the identification information, and transmits the input operation input to the input screen by the user to the information processing device 13. Further, the information processing device 13 executes the transaction on the basis of the input operation transmitted from the information processing terminal 11. With the above operations, the user can perform the input operation to the information processing device 13 by using the information processing terminal 11.

Therefore, in the information processing system 1 according to the present embodiment, the user can perform the input operation to the information processing device 13 by using the information processing terminal 11. Further, the information processing system 1 uses visible light communication that is not visually recognized without using two-dimensional code image that can be visually recognized for the information transmission between the information processing terminal 11 and the information processing device 13. Therefore, in the information processing system 1, input information is hardly skimmed, and thus the security properties can be further improved.

Note that the communication method for transmitting the information by the change of the light emission state of the light source is also called visible light communication. In particular, in the visible light communication, the communication method that receives information by capturing the change of the light emission state of the light source with the imaging unit such as a camera is also called image-sensor communication.

With the communication method, the information is transmitted by the change of the light emission state of the light source, and thus the user easily grasps a generation source and a communication range. Specifically, the information processing device 13 that communicates with the information processing terminal 11 of the user with visible light is limited to the information processing device 13 that can image the light source by the information processing terminal 11 of the user. Therefore, the user easily understands through instinct that the visible light communication is being made with the information processing device 13 that is installed in front of the user. Therefore, the user can easily grasp the information processing device 13 that is communicated with the user even at a place where a large number of information processing devices 13 are installed. Therefore, with the communication method, it is possible for the user to prevent operating an unintended information processing device 13.

Further, with the communication method, light generated from the light source has high straight advance property, and therefore, it is possible to transmit information to the information processing terminal 11 with high directivity. As a consequence, the above-mentioned communication method enables easy control of a target for information transmission, and the possibility for intercepting the communication is therefore low, and the security properties of an information processing system can be improved.

Further, with the above-mentioned communication method, a range capable of imaging the change of the light emission state of the light source is near the information processing device 13 (approximately 3 m or less from the light source), and a communicable range also has the similar degree of range. Consequently, the information processing terminal 11 monitors a communication state of the visible light communication at a predetermined timing. As a consequence, when the visible light communication is not available, it can be determined that the information processing terminal 11 is apart from the information processing device 13. Thus, when the information processing terminal 11 is apart from the information processing device 13, the information processing terminal 11 can cancel the display of the input screen of an operation to the information processing device 13, and prevent the information processing device 13 from being operated from a remote position.

As mentioned above, with the above configuration, the information processing system 1 according to the present embodiment can improve the security properties.

[1.2. Configurations of Information Processing Device and Information Processing Terminal]

Figure 2:
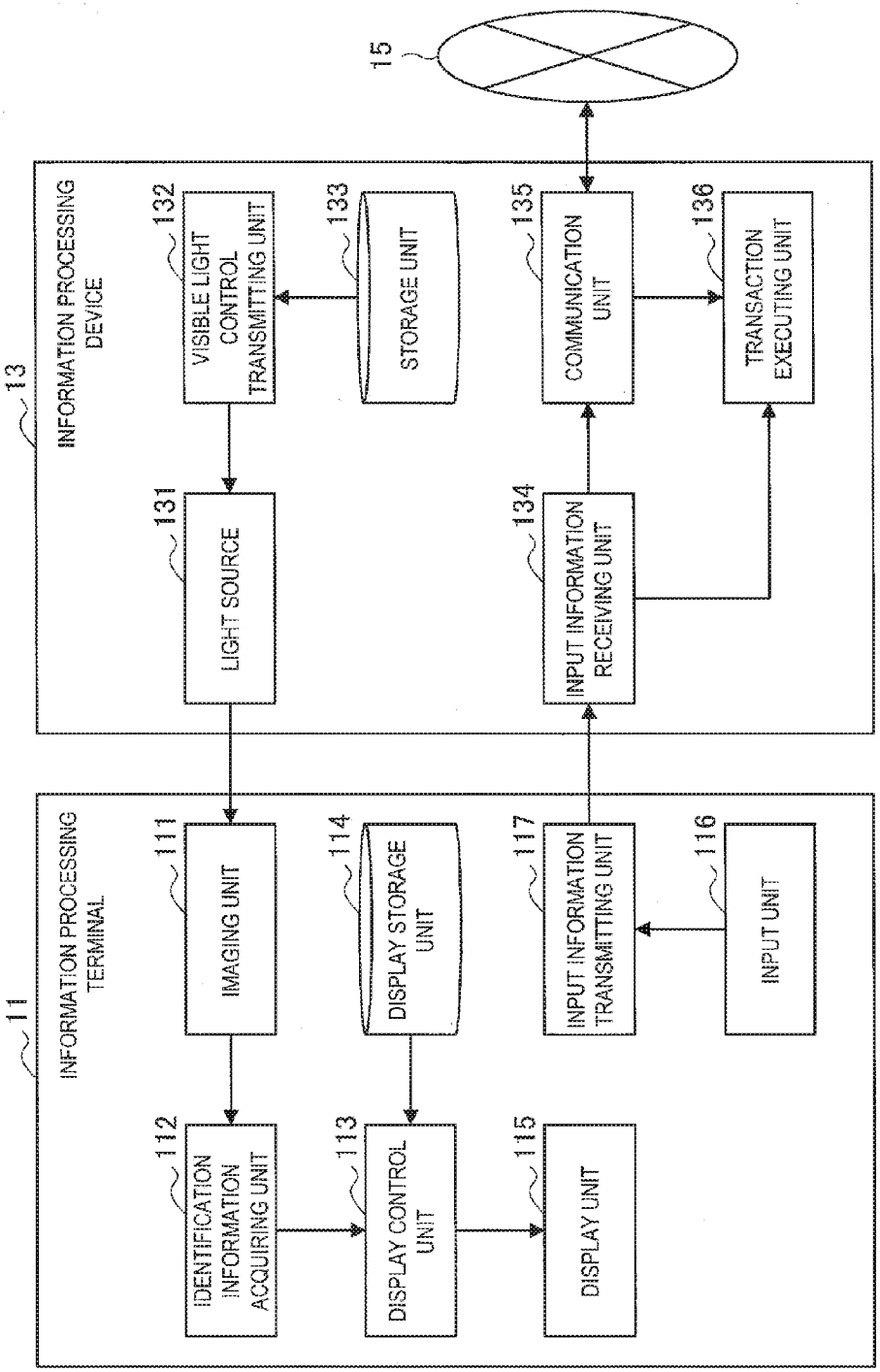
FIG. 2 is a block diagram illustrating internal configurations of an information processing terminal and an information processing device according to the embodiment.

Next, a description will be given of specific functional configurations of the information processing terminal 11 and the information processing device 13 according to the present embodiment with reference to FIG. 2. FIG. 2 is a block diagram illustrating internal configurations of the information processing terminal 11 and the information processing device 13 according to the present embodiment.

As illustrated in FIG. 2, the information processing terminal 11 includes: an imaging unit 111; an identification information acquiring unit 112; a display control unit 113; a display storage unit 114; a display unit 115; an input unit 116; and an input information transmitting unit 117. Further, the information processing device 13 includes: a light source 131; a visible light communication control unit 132; a storage unit 133; an input information receiving unit 134; a communication unit 135; and a transaction executing unit 136.

(Internal Configuration of Information Processing Terminal)

The imaging unit 111 includes an imaging lens, an imaging element, and the like, and acquires an image of a subject (more specifically, the light source 131). Specifically, the imaging unit 111 photoelectrically converts light from the subject incident via the imaging lens with the imaging element constituted by a complementary metal-oxide semiconductor (CMOS) image sensor or a charge-coupled device (CCD) image sensor, into an image signal.

The identification information acquiring unit 112 performs image processing on the image of the light source 131 captured by the imaging unit 111, thereby acquiring identification information of the information processing device 13. Specifically, the identification information acquiring unit 112 detects time-series change of the light emission state of a luminance, a hue, or the like, of the light source 131 from the image captured by the imaging unit 111, and converts the change of the detected light emission state into identification information.

Note that, when the light source 131 is a display device, the identification information acquiring unit 112 can acquire the identification information independently of the direction of the light source 131 if the captured image includes the light source 131. Further, the identification information acquiring unit 112 can acquire the identification information if ¼ to ⅕ of the light source 131 as the display device is included in the whole captured image, as decided by the property of the imaging unit 111.

Herein, the identification information acquiring unit 112 may acquire the identification information of the information processing device 13 from the image of the light source 131 captured at a predetermined timing, and check the situation of the visible light communication with the information processing device 13.

Specifically, while the display control unit 113 allows the input screen for the information processing device 13 to be displayed on the display unit 115, the identification information acquiring unit 112 may check whether or not the identification information of the information processing device 13 can be acquired from the image captured at a predetermined timing by the imaging unit 111. Further, when the identification information of the information processing device 13 cannot be acquired from the image captured by the imaging unit 111 for a predetermined time, the display control unit 113 may cancel the display of the input screen for the information processing device 13. With the configuration, the information processing terminal 11 can prevent the user from operating the information processing device 13 at such a remote position that the information processing device 13 cannot be visually recognized and executing the transaction.

Note that the predetermined timing is, e.g., an interval of approximately several seconds. Further, the identification information acquiring unit 112 may always check whether or not the identification information of the information processing device 13 can be acquired from the captured image of the light source 131. Further, similarly to the predetermined timing, the predetermined time is, e.g., approximately several seconds.

Note that the details of an image processing method of the identification information acquiring unit 112 will be specifically given after <2. Acquiring method of identification information>.

The display control unit 113 controls the display of the input screen for inputting an operation to the information processing device 13 on the basis of the identification information of the information processing device 13 acquired by the identification information acquiring unit 112. For example, the display control unit 113 generates an input screen that imitates an operation screen displayed on the information processing device 13 on the basis of the identification information of the information processing device 13, and controls the display of the input screen on the display unit 115. Note that, when a plurality of operation screens is sequentially displayed by the end of the transaction in the information processing device 13, the display control unit 113 similarly may control to sequentially display a plurality of input screens on the display unit 115.

The display storage unit 114 stores the information of the input screen display-controlled by the display control unit 113. Specifically, the display storage unit 114 stores information for generating the input screen to which the operation to the information processing device 13 is input. Further, the display storage unit 114 may store generation information of a corresponding input screen for each information processing device 13, or for each financial institution to which the information processing device 13 belongs. Herein, the display storage unit 114 may store information of the plurality of input screens when the operation to the information processing device 13 needs to be input across the plurality of input screens by the end of transaction.

The display unit 115 is a display device display-controlled by the display control unit 113. For example, the display unit 115 may be a liquid crystal display (LCD) device, an organic light-emitting display (OLED) device, or the like.

The input unit 116 is an input device for the user to input information, such as a mouse, a keyboard, a button, a microphone, a switch, or a lever. The user, after checking the input screen displayed on the display unit 115, can input an operation to the information processing device 13 by operating the input unit 116. Moreover, the input information input via the input unit 116 is transmitted to the information processing device 13 by the input information transmitting unit 117.

The input information transmitting unit 117 performs communication with the information processing device 13. Specifically, the input information transmitting unit 117 transmits the input information input to the input unit 116 to the input information receiving unit 134 of the information processing device 13. Herein, the input information includes, e.g., information indicating transaction contents to be executed by the information processing device 13, personal authentication information of the user, and the like. Therefore, in order to improve the security properties of the information processing system 1, the input information transmitting unit 117 preferably encrypts and transmits the input information.

Note that the input information transmitting unit 117, if it can transmit information to the information processing device 13, may be any communication interface, e.g., a wireless communication apparatus. However, in order to improve the security properties of the information processing system 1, the input information transmitting unit 117 preferably transmits the input information to the information processing device 13 through communication means with higher confidentiality. For example, the input information transmitting unit 117 may transmit the input information to the information processing device 13 via the visible light communication similarly to the light source 131.

(Internal Configuration of Information Processing Device)

The light source 131 is an illumination or a display device that can control the light emission state, preferably, a display device. Further, the luminance or hue of the light source 131 is controlled by the visible light communication control unit 132. Therefore, the light source 131 can transmit the encoded identification information by the time-series change of a luminance or a hue to the information processing terminal 11.

Herein, the light source 131 preferably is a light source that can change the luminance or hue at such a high frequency (e.g., 70 Hz or more) that the flicker cannot be recognized by the human visual sense. As the light source that can change the luminance or hue at such a high frequency, a light emitting diode (LED) light source, an organic electroluminescence (EL) light source, or the like is exemplified. Further, when the light source 131 is a display device, the above-mentioned light source may be used as a backlight of the display device, or may be used as pixels of the display device.

The visible light communication control unit 132 controls the light emission state of the light source 131 on the basis of the identification information of the information processing device 13. Specifically, the visible light communication control unit 132 encodes the identification information of the information processing device 13, and transmits the encoded identification information by controlling the luminance or hue of the light source 131.

Figure 3:
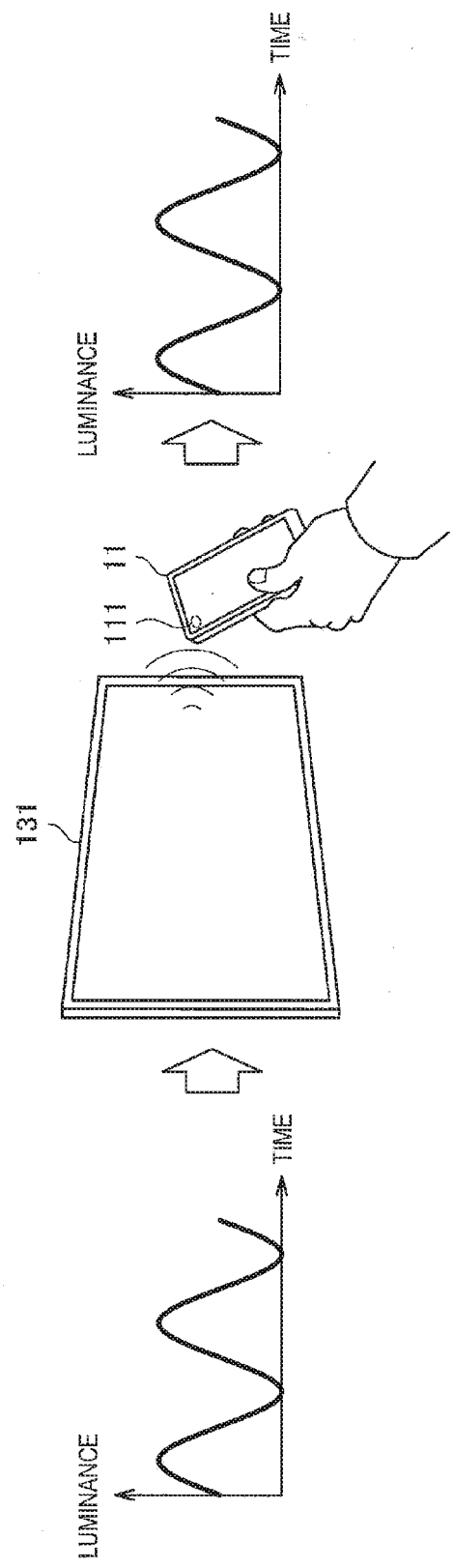
FIG. 3 is an explanatory diagram schematically illustrating visible light communication used in the embodiment.

Herein, a more specific description will be given of a function of the visible light communication control unit 132 with reference to FIG. 3. FIG. 3 is an explanatory diagram schematically illustrating the visible light communication.

First, the visible light communication control unit 132 encodes the identification information of the information processing device 13 to binary information '0' and '1' or the like. Next, as illustrated in FIG. 3, the visible light communication control unit 132 changes the luminance of the light source 131 (more specifically, display device) of the information processing device 13 in chronological order on the basis of the encoded identification information. For example, the visible light communication control unit 132 may control the light emission state of the light source, that is, '1' as a 'high' state of the luminance and '0' as a low' state of the luminance.

On the other hand, in the information processing terminal 11, it is possible to detect the time-series change of the luminance of the light source 131 by capturing an image of the light source 131 (more specifically, the display device) whose luminance changes in chronological order, with the imaging unit 111. Herein, the information processing terminal 11 stores in advance a correspondence relationship between the luminance control by the visible light communication control unit 132, and '0' and '1' of the identification information, and converts the time-series change of the luminance of the light source 131 into encoded identification information on the basis of the correspondence relationship. As a consequence, the information processing terminal 11 can acquire the identification information of the information processing device 13 with the visible light communication.

Herein, the change of the luminance of the visible light communication control unit 132 is controlled by a frequency (e.g., 10 kHz) faster than response speed of the human visual sense. Therefore, the change of the luminance is integrated and cannot be recognized by the user who views the light source 131. Therefore, the visible light communication control unit 132 can transmit the identification information of the information processing device 13 with communication means that is not recognized by the user and does not allow the user to feel flicker or the like.

Note that the visible light communication control unit 132 may transmit the identification information by the change in hue of the light source 131. The human visual sense is dull to the change with respect to the hue rather than the luminance. Therefore, when the visible light communication control unit 132 transmits the identification information with the change in hue instead of the change in the luminance of the light source 131, it is possible to transmit the identification information without recognition by the user also at a lower frequency.

In this case, the visible light communication control unit 132 modulates in chronological order the hue of the light source 131, e.g., between hues with a complementary color relationship, for example, between red and green or between yellow and blue, thereby transmitting the identification information of the information processing device 13 similarly to the change in the luminance.

Note that, when the light source 131 is a display device, the visible light communication control unit 132 may change the luminance or hue of the light source 131 by controlling the luminance or hue of the backlight. However, the technology of the present disclosure is not limited to the example, the visible light communication control unit 132 may change the luminance or hue of the light source 131 by performing image processing on the displayed image and controlling the luminance or hue of the image itself Further, the visible light communication control unit 132 may repetitively transmit the identification information of the information processing device 13 in the same encoding system, or may transmit the information while dynamically changing the encoding system of the identification information.

The storage unit 133 stores the identification information of the information processing device 13. Further, the storage unit 133 may store a program and a database for various processing executed by the information processing device 13, or may store various parameters that need to be stored in performing various processing, the halfway process, and the like.

The input information receiving unit 134 communicates with the information processing terminal 11. Specifically, the input information receiving unit 134 receives the input information for instructing the operation to the information processing device 13 transmitted from the input information transmitting unit 117 of the information processing terminal 11. The input information includes, e.g., information indicating transaction contents to be executed by the information processing device 13, personal authentication information of the user, and the like, and the information processing device 13 executes the transactions on the basis of the input information received by the input information receiving unit 134.

Note that the input information receiving unit 134, if it can receive information from the input information transmitting unit 117, may be any communication interface, e.g., a wireless communication device. However, in order to improve the security properties of the information processing system 1, the input information receiving unit 134 preferably receives the input information from the information processing terminal 11 through communication means with higher confidentiality. For example, the input information receiving unit 134 may receive the input information with the visible light communication similar to the imaging unit 111.

The communication unit 135 communicates various information required for transaction execution with the financial institution server 17 via the network 15. Specifically, the communication unit 135 transmits transaction content information and personal authentication information of the user to the financial institution server 17, and receives a transaction result. The communication unit 135, if it is a communication interface constituted by a communication device or the like for connection to the network 15, may be any communication interface. For example, the communication unit 135 may be a communication device that can be connected to the network 15 by a wired or wireless manner, may be a wired LAN or wireless LAN compatible communication device, or may be a wired communication device that performs wired communication.

The transaction executing unit 136 has a function for executing various transactions performed by a general automatic teller machine, and executes various transactions on the basis of the input information received by the input information receiving unit 134. Specifically, the transaction executing unit 136 executes various transactions such as withdrawal of a deposit, deposit of cash, and check of the balance with an operation of the user on the basis of the input information received by the input information receiving unit 134.

With the above configuration, in the information processing system 1 according to the present embodiment, the input operation to the information processing device 13 can be performed with the information processing terminal 11. Further, the visible light communication that is hard to be skimmed because of dynamic change without the visual recognition is used for the information transmission between the information processing terminal 11 and the information processing device 13. Therefore, the security properties of the information processing system 1 can be improved.

Further, since information is transmitted by the change of the light emission state of the light source in the information processing system 1, the user easily grasps the generation source and the communication range. Therefore, with the information processing system 1, it is possible to prevent the user from operating the information processing device 13 that is different from the user's intension.

[1.3. Operation of Information Processing System]

Figure 4:
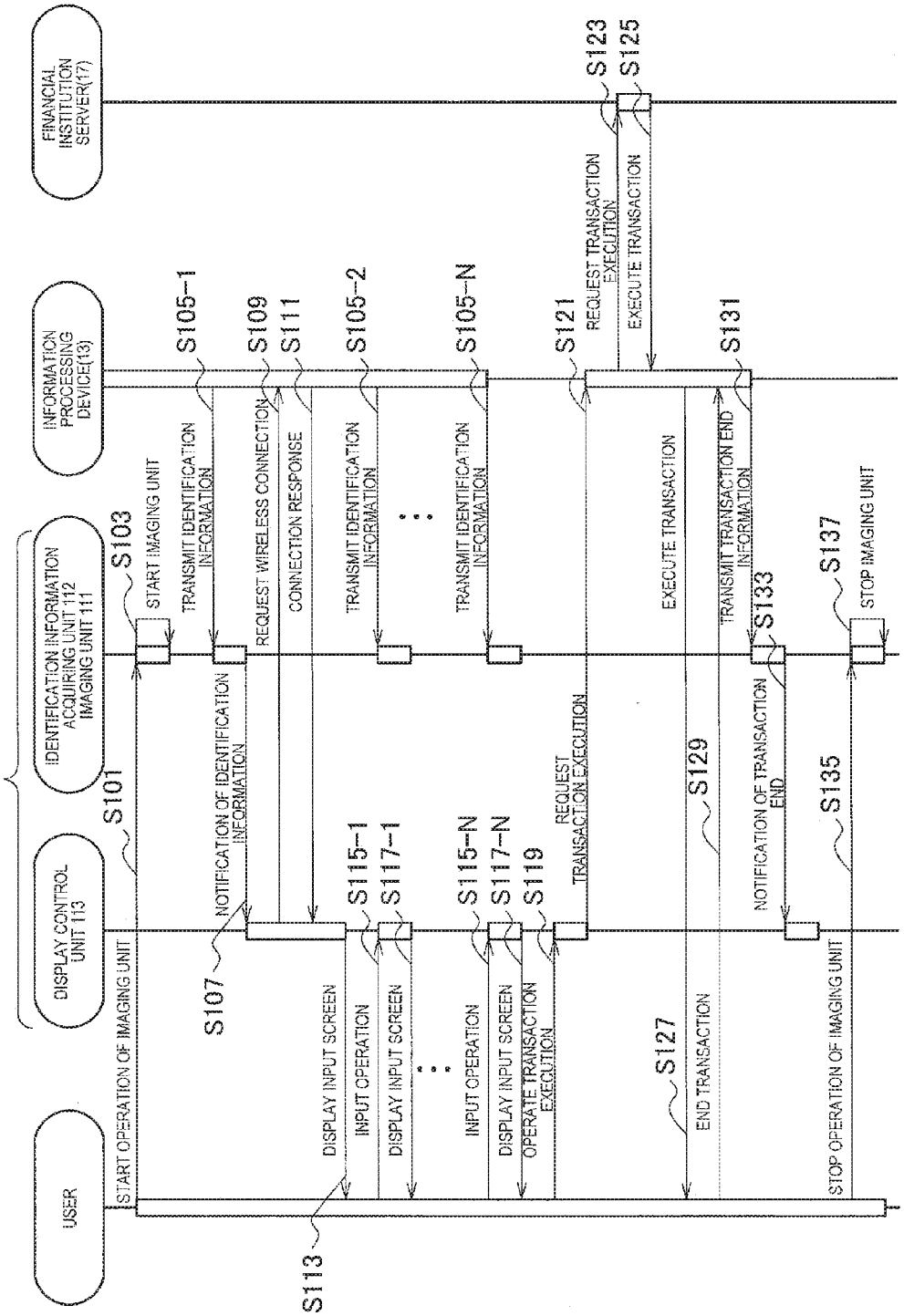
FIG. 4 is a flowchart illustrating an operational flow of the information processing system according to the embodiment.

Next, a description will be given of an operational flow of the information processing system 1 according to the present embodiment with reference to FIG. 4. FIG. 4 is a flowchart illustrating the operational flow of the information processing system 1 according to the present embodiment.

As illustrated in FIG. 4, the user performs a start operation of the imaging unit 111 in the information processing terminal 11 (S101), and the imaging unit 111 starts (S103). The imaging unit 111 captures an image of the light source 131 of the information processing device 13, and identification information is acquired with image processing of the identification information acquiring unit 112 (S105-1). The acquired identification information is notified to the display control unit 113, and the display control unit 113 transmits a request for wireless connection to the relevant information processing device 13 (S109), and receives a connection response from the information processing device 13 (S111). Note that the information processing terminal 11 may transmit the response together with the authentication information of the user in the request for wireless connection in S109.

Further, the display control unit 113 controls the display of the input screen displayed on the display unit 115 on the basis of the identification information to the information processing device 13 (S113). Herein, the user performs an input operation to the input screen displayed on the display unit 115 (S115-1). The display control unit 113 controls the display of the input screen to the input operation of the user (S117-1). The user and the display control unit 113 repeat the above-mentioned input operation (S115-1 to N) of the user and the display control (S117-1 to N) of the input screen until the transaction is determined.

On the other hand, the imaging unit 111 and the identification information acquiring unit 112 check whether or not the identification information of the information processing device 13 can be acquired from the images captured by the imaging unit 111 at a predetermined timing (e.g., an interval of several seconds or at constant time) while the user performs the input operation to the input screen (S105-2 to N). As a consequence, the information processing terminal 11 checks that the user is not apart from the information processing device 13. The imaging unit 111 and the identification information acquiring unit 112 repeat the operation while the transaction is determined in the display control unit 113. Note that the case where the imaging unit 111 and the identification information acquiring unit 112 do not acquire the identification information will be described later with reference to FIG. 5.

Herein, when the transaction is determined and the user performs an operation for transaction execution (S119), the display control unit 113 transmits information that instructs an operation to the information processing device 13, input to the input screen, as a request for transaction execution, to the information processing device 13 (S121). Note that the authentication information of the user may be transmitted to the information processing device 13 together with the request for transaction execution.

The information processing device 13 transmits the request for transaction execution received from the information processing terminal 11 to the financial institution server 17 (S123), thereafter receives an instruction for executing the transaction from the financial institution server 17 (S125), and executes the transaction to the user (S127). Herein, the executed transaction is, e.g., withdrawal of cash, deposit of cash, check of balance, and transfer.

When the user collects, e.g., the withdrawn cash and the transaction ends (S129), the information processing device 13 transmits the notification of ending the transaction to the information processing terminal 11 with the visible light communication using the light source 131 (S131). When the imaging unit 111 receives the notification of ending the transaction, the information processing terminal 11 transmits a notification of ending the transaction to the display control unit 113 (S133) to end the display on the input screen. Further, when the user performs a stop operation of the imaging unit 111 in the information processing terminal 11 after the transaction with the information processing device 13 ends (S135), the imaging unit 111 stops the function (S137).

With the above operation, the information processing system 1 according to the present embodiment can provide services whose security properties are improved to the user.

Figure 5:
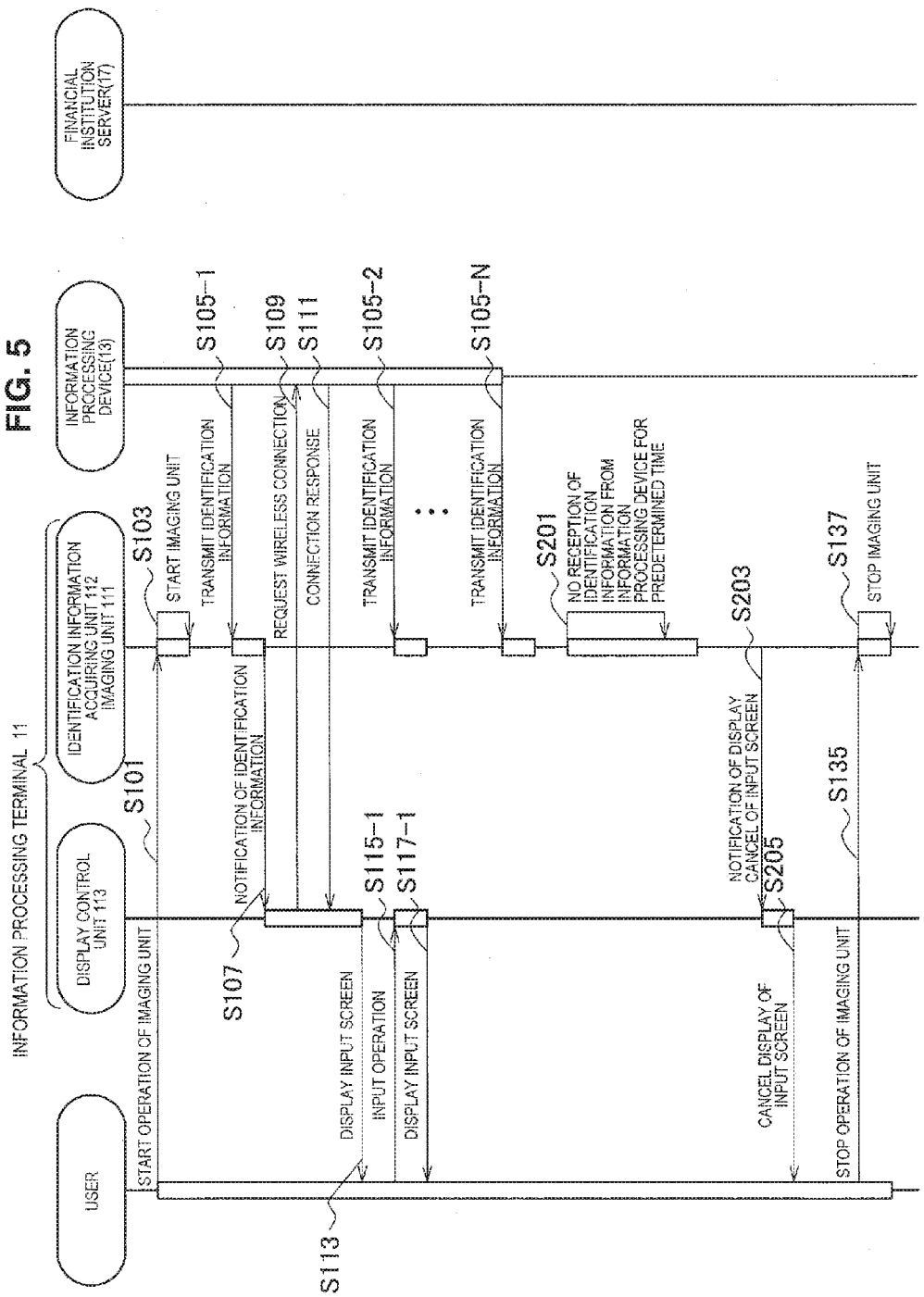
FIG. 5 is a flowchart illustrating an operational flow of the information processing system when identification information is not acquired.

Subsequently, a description will be given of an operational flow of the information processing system 1 when the imaging unit 111 and the identification information acquiring unit 112 cannot acquire the identification information during the operation input to the input screen by the user with reference to FIG. 5. FIG. 5 is a flowchart illustrating an operational flow of the information processing system 1 when the identification information cannot be acquired.

Herein, the case where the imaging unit 111 and the identification information acquiring unit 112 cannot acquire the identification information is a case where, for example, the user or the information processing terminal 11 is apart from the information processing device 13 and the visible light communication from the information processing device 13 cannot be received. Note that, in FIG. 5, operations added with the same reference numerals as those in FIG. 4 are similar to those in FIG. 4, and therefore a description thereof is omitted here.

As illustrated in FIG. 5, when the identification information cannot be acquired from the captured image for a predetermined time during the operation input to the input screen by the user (S201), the identification information acquiring unit 112 transmits a notification of cancelling the display of the input screen to the display control unit 113 (S203). Then, the display control unit 113 cancels the display of the input screen (S205) and stops the function, thereby preventing the execution of the transaction from a place apart from the information processing device 13. Herein, the predetermined time may be approximately several seconds similarly to the predetermined timing. Note that, after the display of the input screen is canceled by the display control unit 113, when the user performs a stop operation of the imaging unit 111 of the information processing terminal 11 (S135), the imaging unit 111 stops the function (S137).

With the above operation, the information processing system 1 according to the present embodiment can prevent the user from operating the information processing device 13 at the place apart from the information processing device 13. Further, when the user loses the information processing terminal 11 during the operation of the information processing terminal 11, the information processing system 1 according to the present embodiment can prevent issuing of the instruction of the transaction execution to the information processing device 13 from the lost information processing terminal 11.

The information processing system 1 according to the present embodiment has been described in detail above.

<2. Acquiring Method of Identification Information>

Subsequently, a description will be given of a specific method of acquiring the identification information from the image of the light source 131 by the identification information acquiring unit 112. A method for acquiring the identification information from the image of the light source 131 by the identification information acquiring unit 112 includes the following first to third acquiring methods, depending on an imaging method of the imaging unit 111 and the kind of images of the light source 131 (more specifically, display device).

[2.1. First Acquiring Method]

First, a description will be given of a first acquiring method of the identification information in the identification information acquiring unit 112. The first acquiring method is an acquiring method of the identification information in the case where the imaging unit 111 captures images of the light source 131 with a global shutter operation and an imaging frame rate of the imaging unit 111 is higher than a frequency for controlling the light emission state of the light source 131 with the visible light communication control unit 132.

Figure 6:
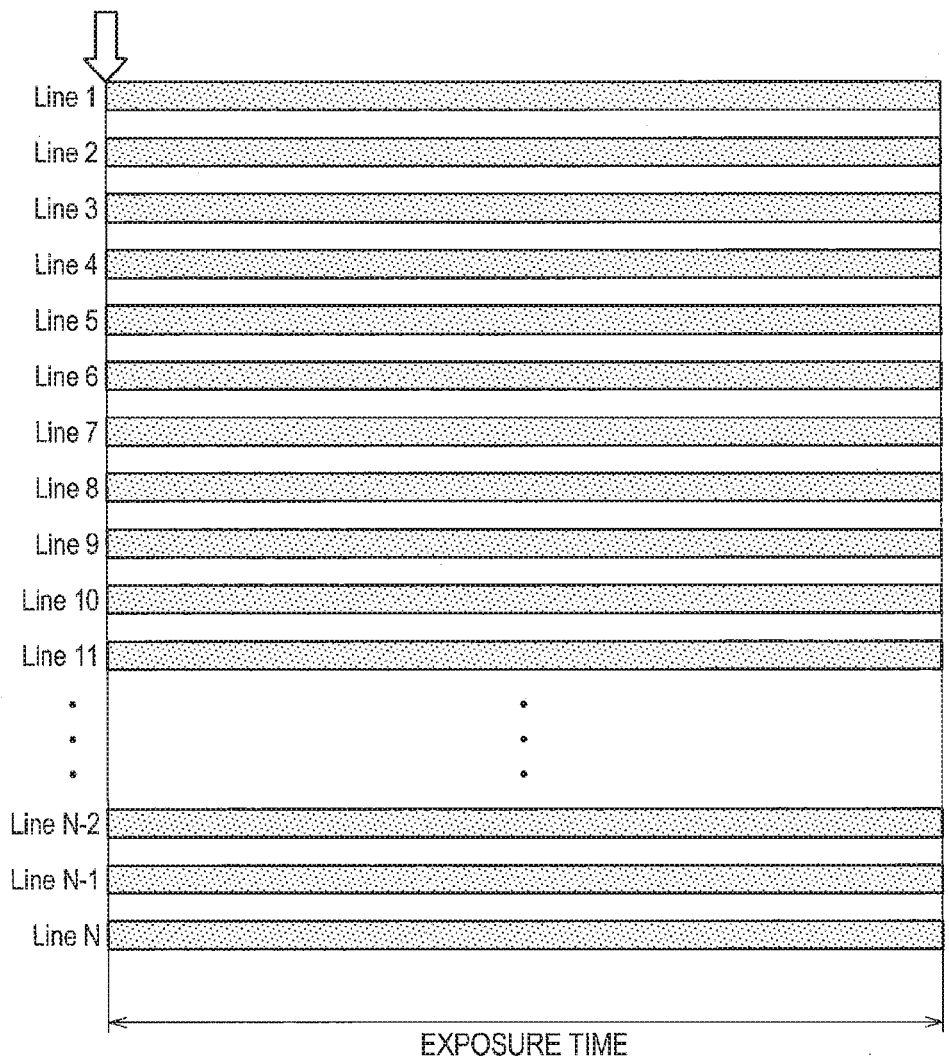
FIG. 6 is an explanatory diagram illustrating a global shutter operation in an imaging device.

Herein, a description will be given of the global shutter operation in the imaging unit 111 with reference to FIG. 6. FIG. 6 is an explanatory diagram illustrating the global shutter operation with the imaging device.

The global shutter operation is one of shutter operations in the imaging device and is a shutter operation for simultaneous imaging in all pixels of the imaging device. As illustrated in FIG. 6, in the imaging device that performs the global shutter operation, in the case of one frame imaging, for example, exposure starts simultaneously in pixels of all lines, and the exposure ends simultaneously.

The image captured by the global shutter operation reflects the light emission state of the light source 131 for the same period of the pixels in all the lines. Therefore, the image is captured as an image in a uniform light emission state in the whole image.

Therefore, the imaging unit 111 that performs the global shutter operation can acquire the change of the light emission state of the light source 131 by making the imaging frame rate higher than a control frequency of the light emission state of the light source 131 with the visible light communication control unit 132. That is, in the imaging unit 111 that performs the global shutter operation, a sampling frequency by the imaging is made higher than a control frequency of the light emission state of the light source 131, and thereby the change of the light emission state of the light source 131 can be detected. Therefore, the identification information acquiring unit 112 can acquire the identification information of the information processing device 13 from the change of the light emission state of the light source 131.

[2.2. Second Acquiring Method]

Next, a description will be given of a second acquiring method of the identification information with the identification information acquiring unit 112. The second acquiring method is an acquiring method of the identification information when the imaging unit 111 captures an image of the light source 131 with a rolling shutter operation.

With the second acquiring method, even when the imaging frame rate of the imaging unit 111 is slower than a frequency for controlling the light emission state of the light source 131 by the visible light communication control unit 132, the identification information acquiring unit 112 can acquire the identification information of the information processing device 13.

Herein, a description will be given of the rolling shutter operation in the imaging unit 111 with reference to FIG. 7.

Figure 7:
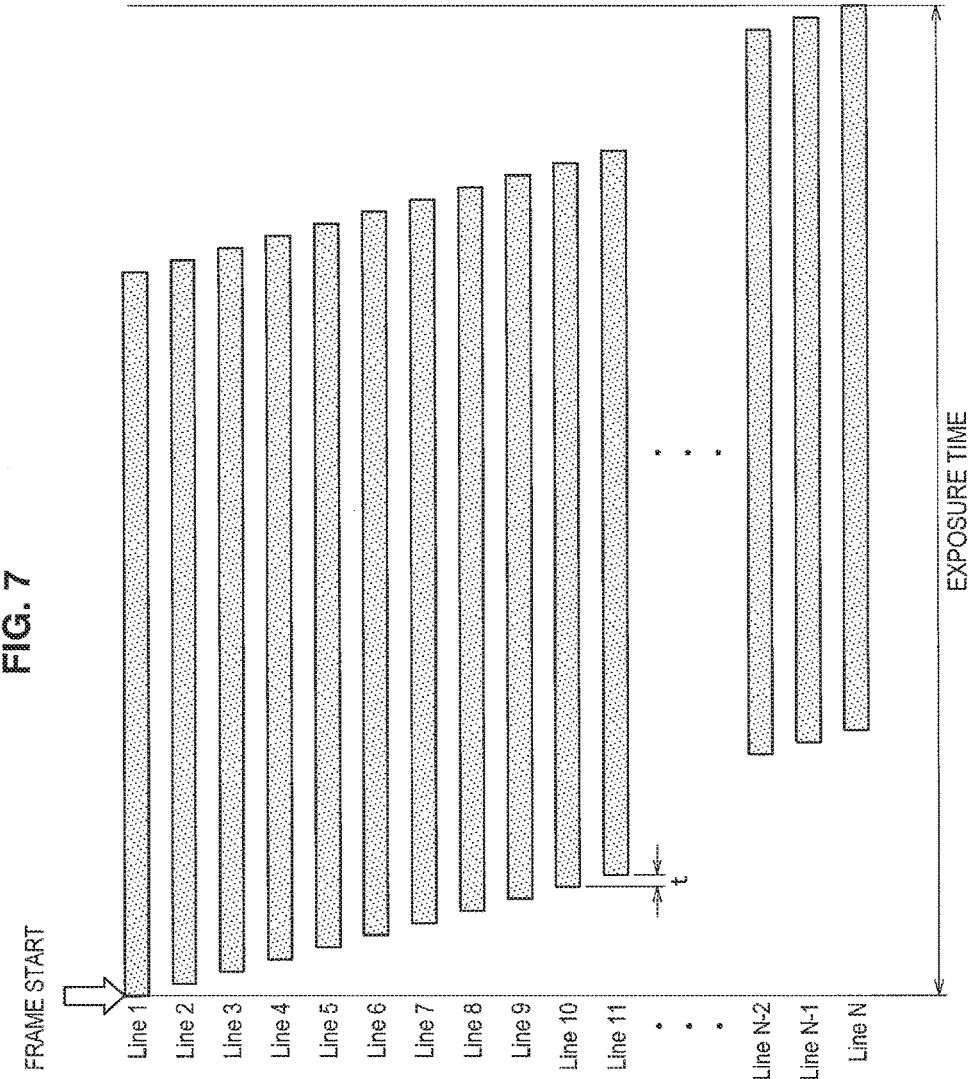
FIG. 7 is an explanatory diagram illustrating a rolling shutter operation in the imaging device.

FIG. 7 is an explanatory diagram illustrating the rolling shutter operation in the imaging device.

The rolling shutter operation is one of shutter operations in the imaging device, and is a shutter operation for sequentially performing imaging for each pixel group (e.g., line) with pixels of the imaging device. For example, as illustrated in FIG. 7, in the imaging device that performs the rolling shutter operation, in the case of one frame imaging, the exposure sequentially starts from the top to the bottom for each pixel of each line. More specifically, in the pixels in each line, the exposure sequentially starts at an interval of a time t, and the exposure sequentially ends after passage of a certain exposure time.

The image captured with the rolling shutter operation reflects the light emission state of the light source 131 for a period with different pixels in each line. Therefore, when the light emission state of the light source 131 changes in chronological order, an image whose light emission state is changed for each line is acquired in the whole image. That is, when the luminance of the light source 131 is changed in chronological order, the image captured with the rolling shutter operation is captured as an image with horizontal stripes having a dark line and a bright line in accordance with the time-series change of the luminance.

Therefore, even when the imaging frame rate is made slower than the control frequency of the light emission state of the light source 131 by the visible light communication control unit 132, the imaging unit 111 that performs the rolling shutter operation can acquire the change of the light emission state of the light source 131 as a horizontal-stripe pattern of the captured image. That is, even when a sampling frequency by the imaging is lower in speed than the control frequency of the light emission state of the light source 131, the imaging unit 111 that performs the rolling shutter operation can detect the change of the light emission state of the light source 131. Therefore, the identification information acquiring unit 112 can acquire the identification information of the information processing device 13 from the change of the light emission state of the light source 131.

Note that, obviously, even the imaging unit 111 that performs the rolling shutter operation can acquire the change of the light emission state of the light source 131 by making the imaging frame rate faster than the control frequency of the light emission state of the light source 131 with the visible light communication control unit 132.

Figure 8:
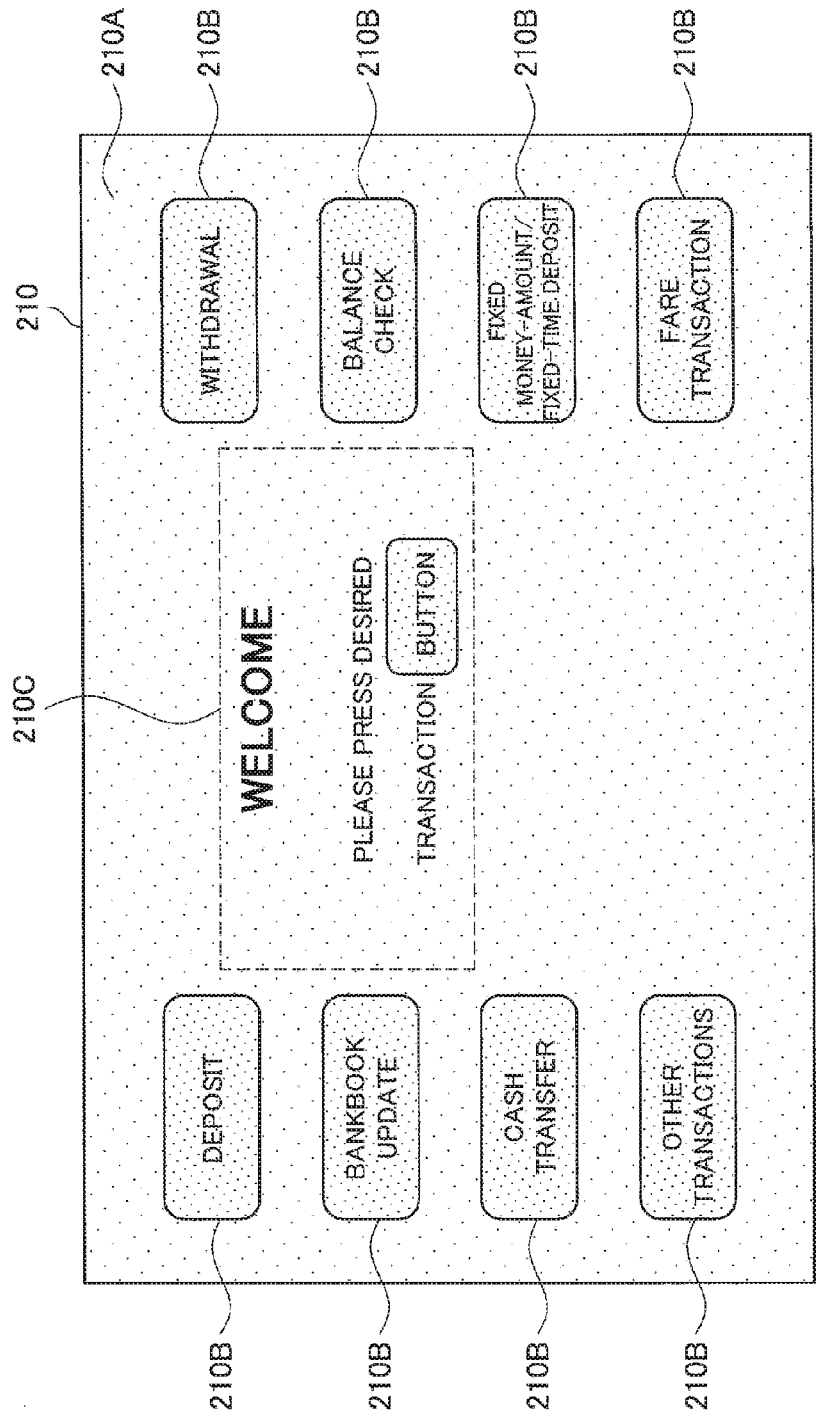
FIG. 8 is an explanatory diagram illustrating an image example displayed on a display device as a light source of the information processing device.
Figure 9:
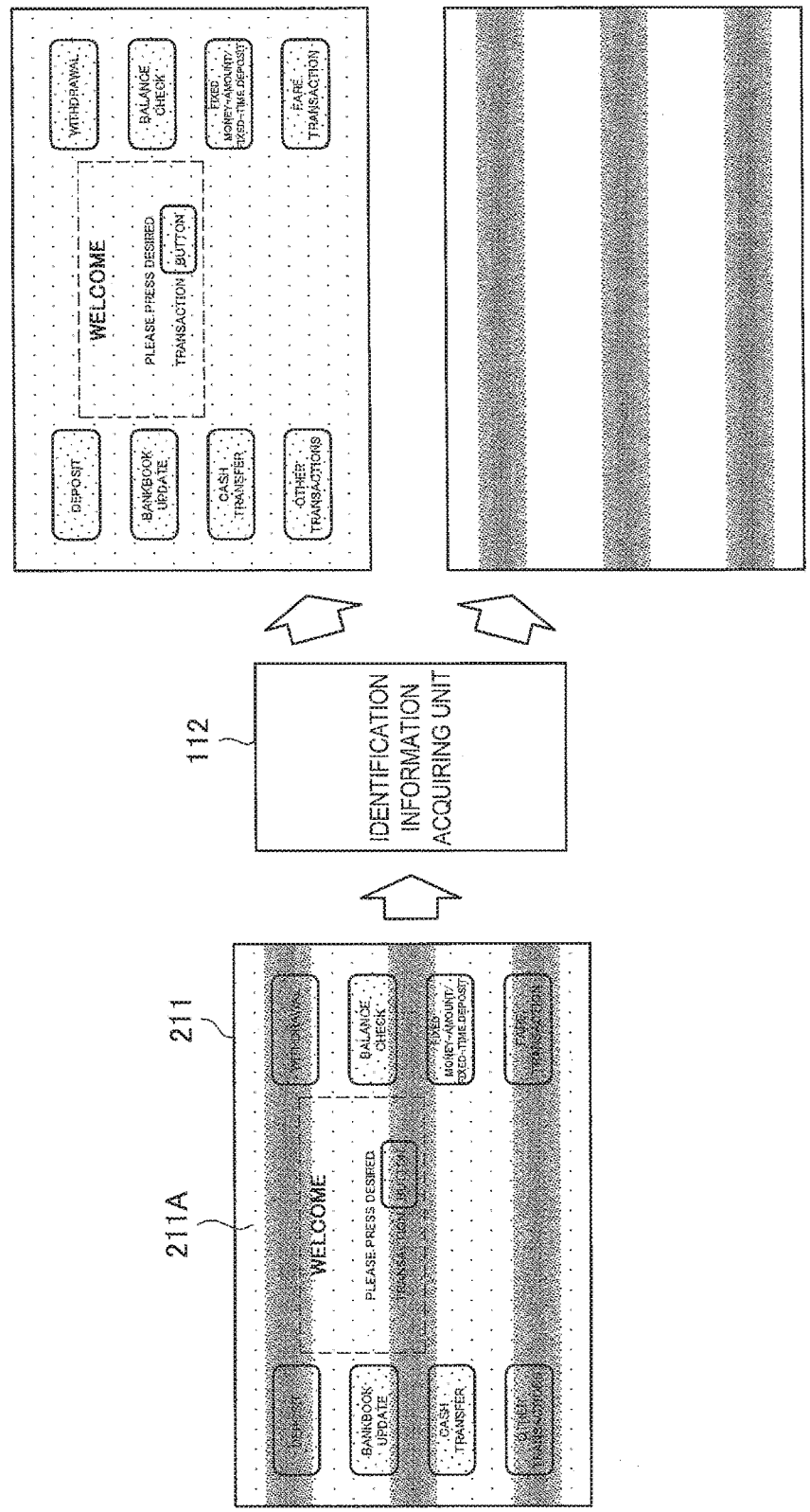
FIG. 9 is an explanatory diagram illustrating a method for acquiring identification information from the image illustrated in FIG. 8 by an identification information acquiring unit.

Further, more specific description will be given of an acquiring method of the identification information executed by the identification information acquiring unit 112 with reference to FIGS. 8 and 9. FIG. 8 is an explanatory diagram illustrating an image example displayed on the display device as the light source 131 of the information processing device 13. FIG. 9 is an explanatory diagram illustrating a method of acquiring the identification information from the image illustrated in FIG. 8 by the identification information acquiring unit 112.

As illustrated in FIG. 8, for example, a display image 210 displayed on a display device (that is, the light source 131) of the information processing device 13 displays a plurality of selecting buttons 210B and a description sentence 210C on a background area 210A.

The background area 210A is an area with, e.g., a uniform hue. The selecting buttons 210B are images illustrating buttons for the user to select various transactions. The description sentence 210C is a character image illustrating an operation to be performed by the user in the display image 210.

Herein, the background area 210A preferably shares a large part of the display image 210. The visible light communication control unit 132 detects the change in the luminance of the display image 210 in the background area 210A with the uniform hue, thereby enabling the identification information to be acquired from the captured image.

Specifically, as illustrated in FIG. 9, the identification information acquiring unit 112 extracts a display image 211 of the light source 131 from the image captured by the imaging unit 111. Next, the identification information acquiring unit 112 detects a background area 211A with the uniform hue from the display image 211. Herein, the identification information acquiring unit 112 may store the hue of the background area 211A in advance, thereby detecting the background area 211A. Further, the identification information acquiring unit 112 may assume the widest area in an area with the same hue in the display image 211 as a background area 211A.

Next, the identification information acquiring unit 112 integrates a pixel value of a pixel determined as the background area 211A for each line to which the pixel belongs. Next, the identification information acquiring unit 112 calculates an average of pixel values in all lines from an integrated value for each line of the pixel value, and further calculates a rate of the integrated value of the pixel value in each line to the average of the pixel values in all the lines. Further, the identification information acquiring unit 112 processes the rate of the integrated value of the pixel values in each line with a shutter function based on the rolling shutter operation. As a consequence, the identification information acquiring unit 112 can separate the encoded identification information from the display image 211. Further, the identification information acquiring unit 112 decodes the encoded identification information, thereby acquiring the identification information of the information processing device 13.

That is, in the above, an integrated value i(y) acquired by integrating pixels in the background area 211A for each line can be expressed by the following formula 101 by assuming that the shutter function is s(t), the identification information is f(t), and hue information of the background area 211A is $i_{bg}$. Note that y is an index of the line and t is a time.

[Math. 1]

$$i(y) = (s(t) * f(t)) \cdot i_{bg} \qquad \text{Formula 101}$$

Herein, individual s(t) and $i_{bg}$ are well known and the formula 101 is transformed to a matrix expression (formula 102). Thereafter, a pseudo inverse matrix S is multiplied to both sides, thereby calculating a matrix expression F of the identification information (formula 103). As a consequence, the identification information acquiring unit 112 can acquire the identification information.

[Math. 2]

$$I = SFi_{bg} \qquad \text{Formula 102}$$

$$F = \frac{1}{i_{bg}} S^+ I \qquad \text{Formula 103}$$

The second acquiring method of the identification information in the identification information acquiring unit 112 has been specifically described above. With the second acquiring method, the identification information acquiring unit 112 can acquire the identification information of the information processing device 13 even if the imaging frame rate of the imaging unit 111 is slower than the frequency for controlling the light emission state of the light source 131 with the visible light communication control unit 132.

[2.3. Third Acquiring Method]

Subsequently, a description will be given of the third acquiring method of the identification information in the identification information acquiring unit 112. The third acquiring method is an acquiring method of the identification information when the imaging unit 111 performs imaging with the rolling shutter operation and the image of the light source 131 is simultaneously captured for different exposure times.

With the third acquiring method, even when the background area 210A cannot be detected from the display image 210 or the display image 210 is a moving image, the identification information acquiring unit 112 can acquire the identification information of the information processing device 13.

Figure 10:
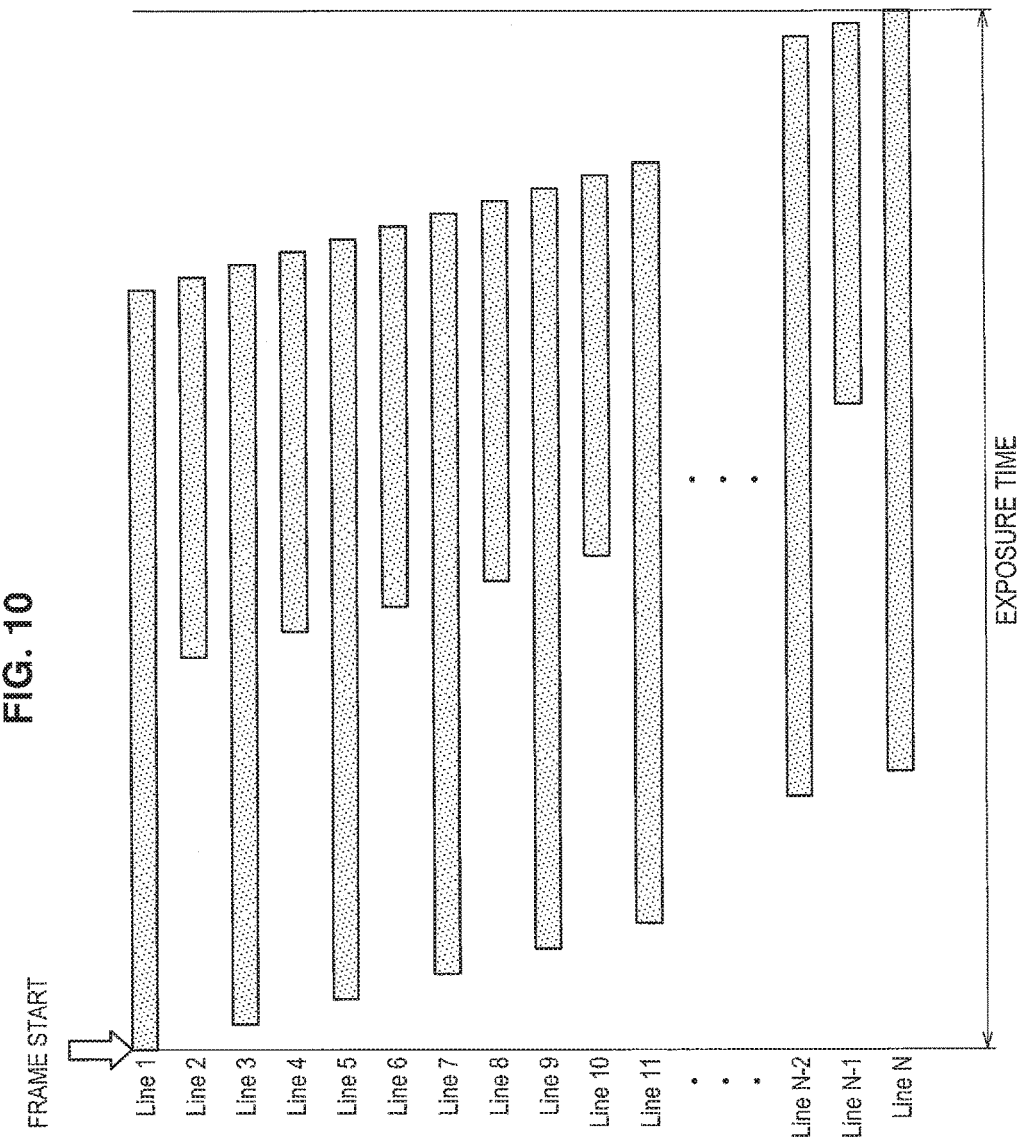
FIG. 10 is an explanatory diagram illustrating an operation for performing imaging simultaneously at different exposure times in the imaging device that performs the rolling shutter operation.

Herein, a description will be given of a configuration when the imaging unit 111 that performs the rolling shutter operation performs simultaneous imaging for different exposure times with reference to FIG. 10. FIG. 10 is an explanatory diagram illustrating an operation in performing simultaneous imaging for different exposure times in the imaging device that performs the rolling shutter operation.

As illustrated in FIG. 10, for example, in the case of one frame imaging, the imaging device performs the rolling shutter operation that sequentially starts the exposure for each line. However, for each line, the exposure is executed for different exposure time for every other line. With the configuration, although the resolution in the vertical direction is reduced, the imaging device can simultaneously acquire images captured for different exposure times. The identification information acquiring 112 uses a plurality of images captured for different exposure times, thereby acquiring the identification information of the information processing device 13 even in the case where the background area 210A cannot be detected from the display image 210 or where the display image 210 is a moving image.

Note that, as long as the imaging device can simultaneously capture images of the light source 131 for different exposure times, the control method of the exposure time of each pixel is not particularly limited. That is, the imaging device may control the exposure time for each line to capture the images for different exposure times and the exposure time may be controlled for each pixel.

Figure 11:
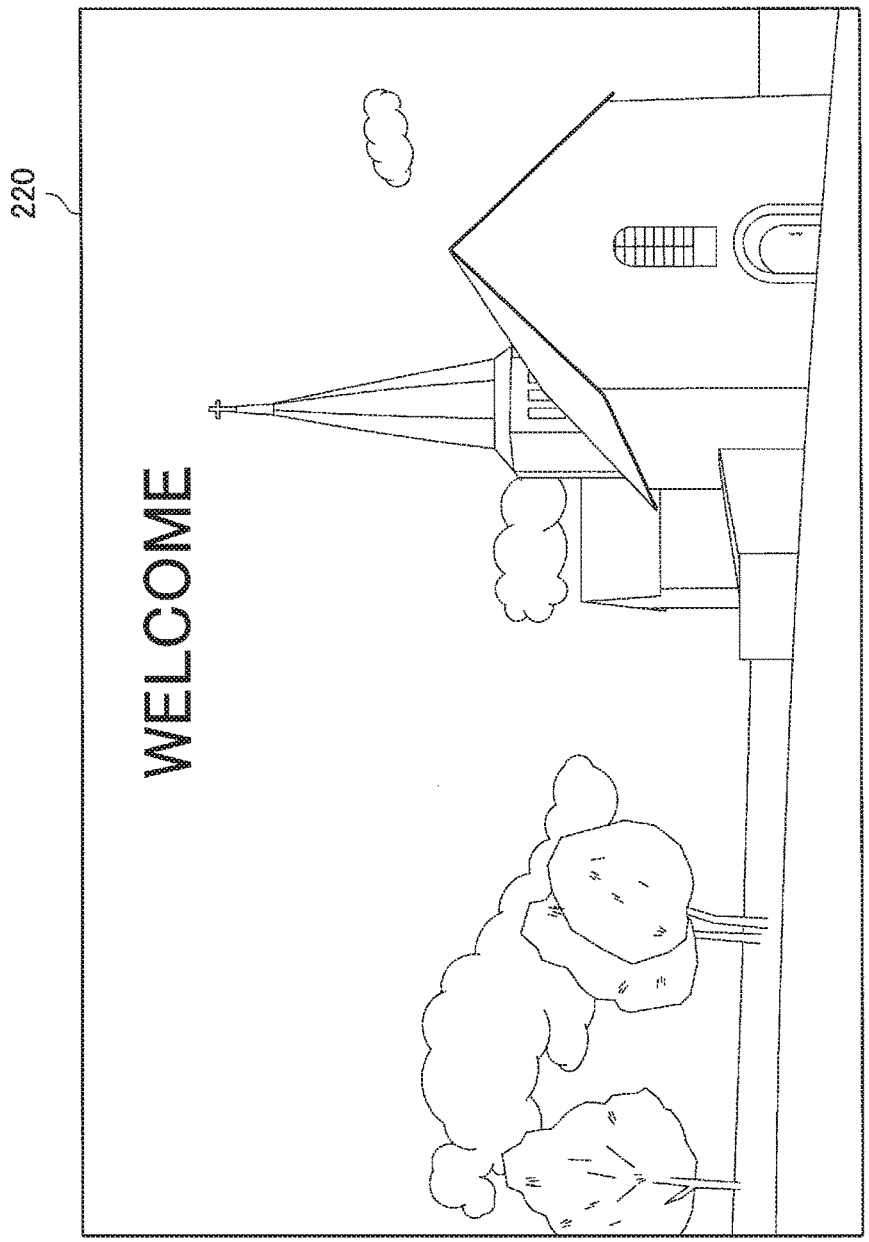
FIG. 11 is an explanatory diagram illustrating an image example displayed on the display device as the light source of the information processing device.

Hereinbelow, a more specific description will be given of an acquiring method of the identification information executed by the identification information acquiring unit 112 with reference to FIGS. 11 and 12. FIG. 11 is an explanatory diagram illustrating an image example displayed on the display device (that is, the light source 131) of the information processing device 13, and FIG. 12 is an explanatory diagram illustrating a method for acquiring the identification information from the image illustrated in FIG. 11 by the identification information acquiring unit 112.

As illustrated in FIG. 11, a display image 220 displayed on the display device (that is, the light source 131) of the information processing device 13 is, for example, an image of a scenery photograph whose background area cannot be specified.

Figure 12:
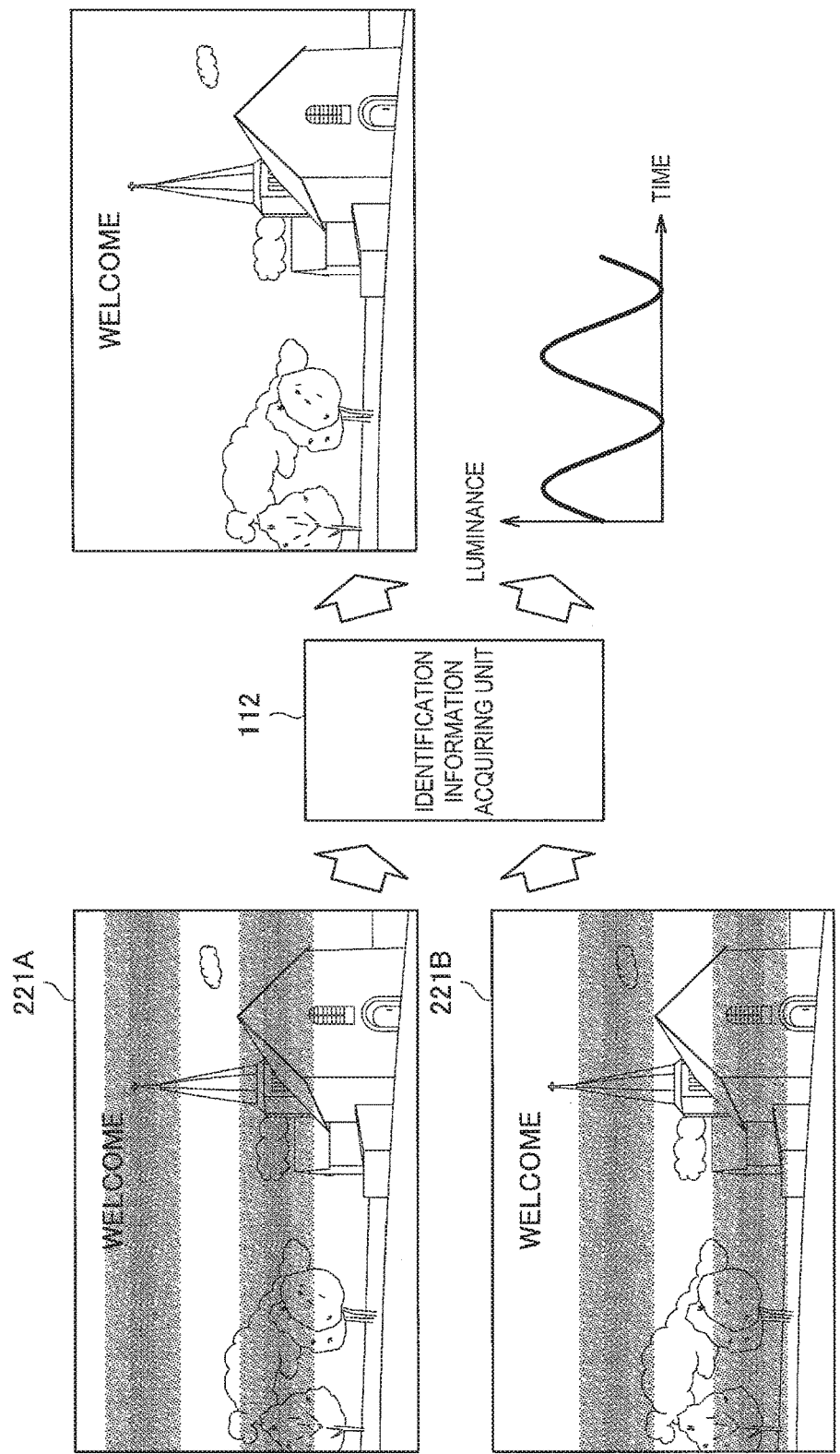
FIG. 12 is an explanatory diagram illustrating a method for acquiring identification information from the image illustrated in FIG. 11 by the identification information acquiring unit.

Herein, as illustrated in FIG. 12, the identification information acquiring unit 112 can acquire the identification information by using a plurality of display images 221A and 221B with different exposure times. Specifically, the identification information acquiring unit 112 extracts the display images 221A and 221B of the light source 131 from the image captured by the imaging unit 111. Herein, since the display images 221A and 221B are images captured for different exposure times, integrating times of the change of the light emission state (e.g., luminance) of the light source 131 are different and the images have different horizontal stripes with brightness and darkness.

That is, similarly to the second acquiring method, an integrated value $i_1(y)$ acquired by integrating pixels of the display image 221A for each line and an integrated value $i_2(y)$ acquired by integrating pixels of the display image 221B for each line can be expressed with the following formula 201 and formula 202 by using individual shutter functions $s_1(t)$ and $s_2(t)$, identification information $f(t)$, and hue information $i_{bg}(y)$ of the original images of the display images 221A and 221B. Note that y denotes positions of the display images 221A and 221B in the vertical direction, and t denotes a time.

[Math. 3]

$$i_1(y) = (s_1(t) * f(t)) \cdot i_{bg}(y) \qquad \text{Formula 201}$$

$$i_2(y) = (s_2(t) * f(t)) \cdot i_{bg}(y) \qquad \text{Formula 202}$$

Herein, it is possible to calculate $i_1(y)$ and $i_2(y)$ from the display images 221A and 221B. Further, $s_1(t)$ and $s_1(t)$ are well-known shutter functions. Therefore, the identification information acquiring unit 112 can calculate the identification information $f(t)$ by erasing $i_{bg}(y)$ in the formula 201 and the formula 202.

With the above method, the identification information acquiring unit 112 can separate the encoded identification information, thereby decoding the encoded identification information and acquiring the identification information of the information processing device 13.

Note that, when the length of any of the exposure times of the imaging unit 111 is an integral multiple of a period of the change in the luminance of the light source 131, the change of the light emission state of the light source 131 is uniform in the whole captured image with the integration. That is, the captured display image is an image without formation of horizontal stripes with brightness and darkness. Therefore, $i_1(y)$ can be expressed with a simpler formula as the following formula 203. Thus, in this case, the formula 202 can be modified as the following formula 204.

[Math. 4]

$$i_1(y) = k \cdot i_{bg}(y) \qquad \text{Formula 203}$$

$$i_2(y) = (s_2(t) * f(t)) \cdot \frac{i_1(y)}{k} \qquad \text{Formula 204}$$

In the above, the formula 204 has a similar format as that of the formula 102 in the second acquiring method with the known hue of the background area 211A. Therefore, similarly to the second acquiring method, the identification information acquiring unit 112 can more easily separate the encoded identification information from the display images 221A and 221B.

Further, when the length of any of the exposure times of the imaging unit 111 is enough long to the period of the change in the luminance of the light source 131 (that is, when the exposure time is long to the extent that the change in the luminance of the light source 131 can be ignored), $i_1(y)$ can also be expressed with the formula 203. Therefore, in this case also, the identification information acquiring unit 112 can more easily separate the identification information that is encoded from the display images 221A and 221B.

The third acquiring method of the identification information in the identification information acquiring unit 112 has been specifically described above. With the third acquiring method, the identification information acquiring unit 112 can acquire the identification information of the information processing device 13 even in the case where the background area 210A cannot be detected from the display image 210 or where the display image 210 is a moving image.

The specific method in the case of acquiring the identification information from the image of the light source 131 by the identification information acquiring unit 112 has been described in detail above.

<3. Hardware Configuration According to an Embodiment of the Present Disclosure>

Figure 13:
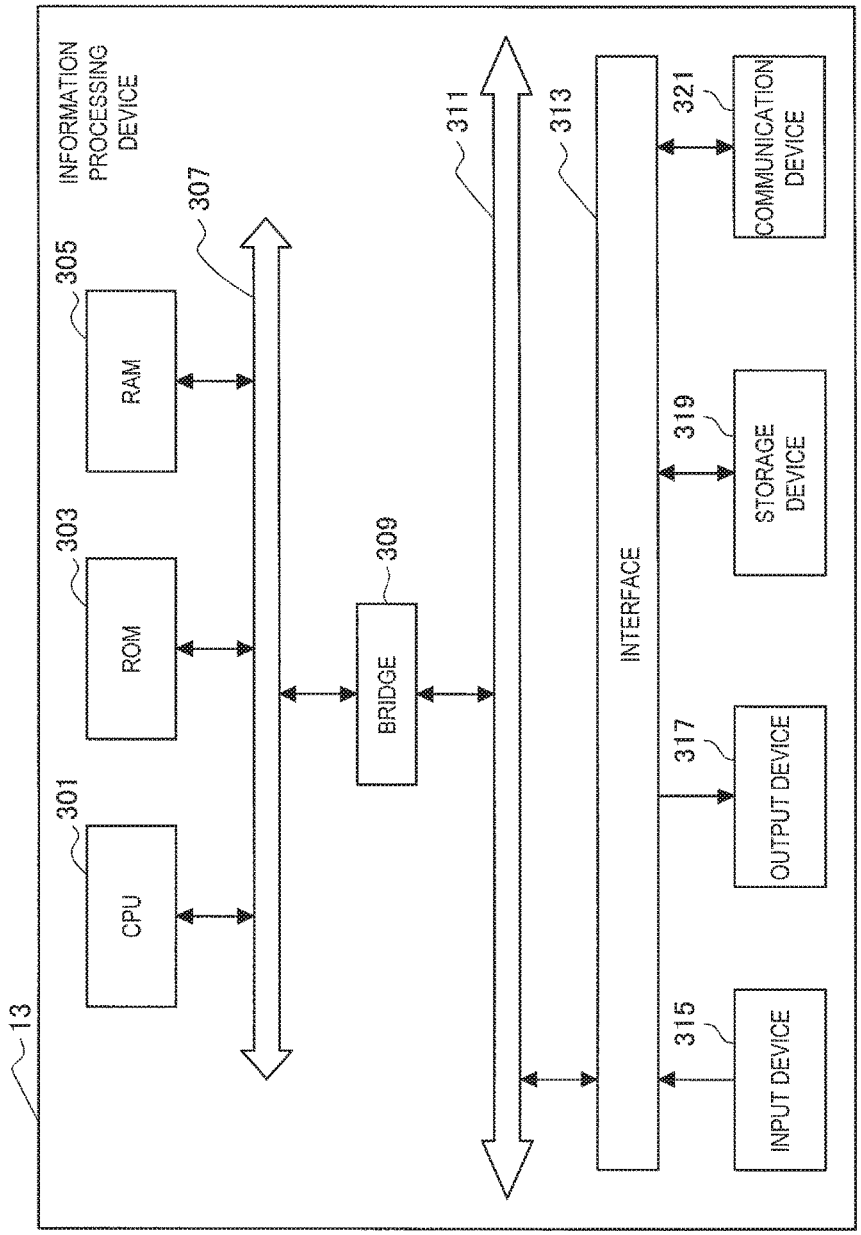
FIG. 13 is a block diagram illustrating an example of a hardware configuration forming the information processing device according to the embodiment.

Subsequently, a description will be given of hardware configurations of the information processing terminal 11 and the information processing device 13 according to the present embodiment with reference to FIG. 13. FIG. 13 is a block diagram illustrating an example of the hardware configuration forming the information processing device 13 according to the present embodiment. That is, information processing of the information processing terminal 11 and the information processing device 13 according to the present embodiment is realized in corporation with software and hardware. Note that the hardware configuration of the information processing terminal 11 is substantially similar to that of the information processing device 13, and therefore a description thereof is here omitted.

As illustrated in FIG. 13, the information processing device 13 includes: a central processing unit (CPU) 301; a read only memory (ROM) 303; a random access memory (RAM) 305; a bridge 309; internal buses 307 and 311; an interface 313; an input device 315; an output device 317; a storage device 319; and a communication device 321.

The CPU 301 functions as an arithmetic processing device and a control device, and controls the entire operations in the information processing device 13 according to various programs. The ROM 303 stores a program and an arithmetic parameter used by the CPU 301. The RAM 305 temporarily stores a program used in the execution of the CPU 301, a parameter that properly changes in the execution, and the like. The CPU 301 executes functions of, e.g., the visible light communication control unit 132, the transaction executing unit 136, and the like. Further, in the information processing terminal 11, the CPU 301 realizes functions of the identification information acquiring unit 112, the display control unit 113, and the like.

The CPU 301, the ROM 303, and the RAM 305 are mutually connected by the bridge 309, the internal buses 307 and 311, and the like. Further, the CPU 301, the ROM 303, and the RAM 305 are also connected to the input device 315, the output device 317, the storage device 319, and the communication device 321 via the interface 313.

The input device 315 is a device for input of the information from the user or externally. In addition, the input device 315 includes an input control circuit or the like that generates an input signal on the basis of the input information and outputs the signal to the CPU 301. In the information processing terminal 11, the input device 315 executes realization of, e.g., the imaging unit 111, the input unit 116, and the like.

The output device 317 includes, e.g., a display device such as a liquid crystal display device or an organic EL display device, and an audio output device such as a speaker and a headphone. The output device 317 realizes, e.g., a function of the light source 131 or the like.

The storage device 319 is a device for storing the data configured as an example of the storage unit of the information processing device 13. The storage device 319 may include a storage medium, a storage device that stores data to the storage medium, a reading device that reads data from the storage medium, and a deleting device that deletes the stored data. The storage device 319 realizes, e.g., a function of the storage unit 133 or the like. In the information processing terminal 11, the storage device 319 realizes a function of, e.g., the display storage unit 114 or the like.

The communication device 321 is a communication interface constituted by a communication device or the like for connection to, e.g., another device or the network 15. Further, the communication device 321 may be a wireless LAN compatible communication device or a cable communication device for wired cable communication. Further, the communication device 321 realizes functions of, e.g., the input information receiving unit 134, the communication unit 135, and the like. In the information processing terminal 11, the communication device 321 realizes functions of, e.g., the input information transmitting unit 117 and the like.

Further, it is possible to make a computer program for exhibiting the same functions as each configuration of the information processing terminal 11 or the information processing device 13 according to the present embodiment described above as hardware of the CPU, ROM, and RAM. In addition, the storage medium storing the computer program is also provided.

<4. Conclusion>

As mentioned above, with the information processing system 1 according to the present embodiment, the user can perform the input operation to the information processing device 13 by using the information processing terminal 11. The information processing system 1 uses the visible light communication that is dynamically changed and is not visually recognized for the information transmission between the information processing terminal 11 and the information processing device 13. Therefore, skimming of the information can be prevented and the security properties can be improved.

Further, since the information is transmitted with the visible light communication using the change of the light emission state of the light source in the information processing system 1, the user can easily grasp the generation source and the communication range. Therefore, it is possible to prevent the user from operating the information processing device 13 that is different from user's intention.

Further, with the information processing system 1, it is possible to determine whether or not the information processing terminal 11 is apart from the information processing device 13 by monitoring the communication state of the visible light communication. Therefore, with the information processing system 1, in the case where the information processing terminal 11 is apart from the information processing device 13, the display of the input screen displayed on the information processing terminal 11 is canceled, and thereby it is possible to prevent the information processing device 13 from being operated from a remote position.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

an information processing device including a light source, and a visible light communication control unit configured to control a light emission state of the light source on the basis of identification information of the information processing device and transmit the identification information; and an information processing terminal including an imaging unit, an identification information acquiring unit configured to perform image processing on an image of the light source captured by the imaging unit and acquire the identification information of the information processing device, a display control unit configured to control display of an input screen for input of an operation to the information processing device on the basis of the identification information, and an input information transmitting unit configured to transmit input information input to the input screen to the information processing device.

(2)

The information processing system according to (1), wherein the visible light communication control unit transmits the identification information by changing a luminance or a hue of the light source.

(3)

The information processing system according to (1) or (2), wherein the imaging unit images the light source with a rolling shutter operation for performing imaging sequentially for each of partial pixels.

(4)

The information processing system according to (3), wherein the visible light communication control unit controls a light emission state of the light source at a frequency higher than a frame rate of the imaging unit.

(5)

The information processing system according to (4), wherein the identification information acquiring unit extracts a background area of a predetermined luminance or hue from the image of the light source captured by the imaging unit and acquires the identification information on the basis of change in a luminance or a hue of the background area.

(6)

The information processing system according to (4), wherein the imaging unit simultaneously captures a plurality of images of the light source with different exposure times, and the identification information acquiring unit acquires the identification information on the basis of the plurality of captured images of the light source.

(7)

The information processing system according to (1) or (2), wherein the visible light communication control unit controls the light emission state of the light source at a frequency lower than a frame rate of the imaging unit, and the imaging unit images the light source with a global shutter operation for performing imaging simultaneously for all pixels.

(8)

The information processing system according to any one of (1) to (7), wherein the identification information acquiring unit acquires the identification information of the information processing device by performing image processing on the image captured by the imaging unit at a predetermined timing, and the display control unit cancels the display of the input screen when the identification information acquiring unit does not acquire the identification information of the information processing device for a predetermined time.

(9)

The information processing system according to any one of (1) to (8), wherein the light source is a display unit that displays an image.

(10)

The information processing system according to any one of (1) to (9), wherein the information processing device is an automatic teller machine, and the information processing device executes a transaction on the basis of the input information received from the information processing terminal and authentication information of a user of the information processing terminal.

An information processing device including:

a light source; and a visible light communication control unit configured to control a light emission state of the light source on the basis of identification information of the information processing device and transmit the identification information.

(12)

An information processing terminal including:

an imaging unit;

an identification information acquiring unit configured to perform image processing on an image captured by the imaging unit and acquire identification information of an information processing device transmitted by a light emission state of a light source of the information processing device;

a display control unit configured to control display of an input screen for input of an operation to the information processing device on the basis of the identification information; and an input information transmitting unit configured to transmit input information input to the input screen to the information processing device.

REFERENCE SIGNS LIST

1 information processing system
11 information processing terminal
13 information processing device
15 network
17 financial institution server
111 imaging unit
112 identification information acquiring unit 113 display control unit
114 display storage unit
115 display unit
116 input unit
117 input information transmitting unit
131 light source
132 visible light communication control unit
133 storage unit
134 input information receiving unit
135 communication unit
136 transaction executing unit

The invention claimed is:

1. An information processing system, comprising:
an information processing terminal including terminal circuitry; and
an information processing device including;
a light source; and
device circuitry configured to:
control a light emission state of the light source based on identification information of the information processing device such that a frequency of the light emission state of the light source is higher than a frame rate associated with an imaging device of the information processing terminal; and
transmit the identification information based on the light emission state of the light source,
wherein the terminal circuitry is configured to:
control the imaging device to capture an image of the light source;
execute an image processing operation on the image of the light source;
acquire the identification information of the information processing device based on the image processing operation;
control display of an input screen for input of an operation to the information processing device based on the acquired identification information;
receive a user input on the input screen; and
transmit input information associated with the user input to the information processing device.

2. The information processing system according to claim 1, wherein the device circuitry is further configured to transmit the identification information by conversion of one of luminance of the light source or hue of the light source.

3. The information processing system according to claim 1, wherein the terminal circuitry is further configured to control the imaging device to capture the image of the light source based on a rolling shutter operation that corresponds to a sequential imaging operation associated with each partial pixel of a plurality of partial pixels of the light source.

4. The information processing system according to claim 3, wherein the terminal circuitry is further configured to:
extract a background area of luminance or hue from the image of the light source; and
acquire the identification information based on a change in the luminance or the hue of the background area.

5. The information processing system according to claim 3, wherein the terminal circuitry is further configured to:

control the imaging device to capture concurrently a plurality of images of the light source with different exposure times; and
acquire the identification information based on the plurality of captured images of the light source.

6. The information processing system according to claim 1,
wherein the device circuitry is further configured to control the light emission state of the light source at the frequency lower than the frame rate of the imaging device, and
the terminal circuitry is further configured to control the imaging device to capture the image of the light source based on a global shutter operation that corresponds to a concurrent imaging operation for a plurality of pixels of the light source.

7. The information processing system according to claim 1, wherein the terminal circuitry is further configured to:
acquire the identification information of the information processing device based on the image processing operation on the image of the light source at a particular time instance; and0
cancel the display of the input screen when the identification information of the information processing device is not acquired for the particular time instance.

8. The information processing system according to claim 1, wherein the light source corresponds to a display device configured to display the image.

9. The information processing system according to claim 1,
wherein the information processing device corresponds to an automatic teller machine, and
the device circuitry is further configured to execute a transaction based on the input information received from the information processing terminal and authentication information of a user of the information processing terminal.

10. An information processing terminal, comprising:
terminal circuitry configured to:
control an imaging device to capture an image of a light source of an information processing device, wherein luminance of the light source varies based on a light emission state of the light source, and
a frequency of the light emission state of the light source is higher than a frame rate associated with the imaging device;
execute an image processing operation on the image of the light source;
acquire identification information of the information processing device based on the image processing operation;
control display of an input screen for input of an operation to the information processing device based on the acquired identification information;
receive a user input on the input screen; and
transmit input information associated with the user input to the information processing device.

* * * * *